United States Patent [19]

Shon

[11] Patent Number: 5,687,944

[45] Date of Patent: Nov. 18, 1997

[54] ANGLE CONTROLLER FOR IMAGE DISPLAY

[75] Inventor: Young-ho Shon, Seoul, Rep. of Korea

[73] Assignee: LG Electronics, Inc., Seoul, Rep. of Korea

[21] Appl. No.: 511,127

[22] Filed: Aug. 4, 1995

[30] Foreign Application Priority Data

Aug. 6, 1994 [KR] Rep. of Korea .................. 1994-19403

[51] Int. Cl.[6] ...................................................... A47G 29/00
[52] U.S. Cl. ........................ 248/349.1; 248/371; 248/919
[58] Field of Search ................................ 248/131, 289.11, 248/349.1, 415, 418, 917, 919, 920, 921, 922, 371

[56] References Cited

U.S. PATENT DOCUMENTS

| | | | |
|---|---|---|---|
| 3,576,988 | 5/1971 | Henning | 248/289.11 X |
| 3,813,491 | 5/1974 | Pennar | 248/919 X |
| 4,533,105 | 8/1985 | Cornwell, Jr. et al. | |
| 4,554,590 | 11/1985 | Chelin et al. | 248/371 |
| 4,562,987 | 1/1986 | Leeds et al. | 248/920 X |
| 4,591,123 | 5/1986 | Bradshaw et al. | 248/371 X |
| 5,209,446 | 5/1993 | Kawai | 248/920 X |
| 5,398,903 | 3/1995 | Cho | 248/921 X |
| 5,588,625 | 12/1996 | Beak | 248/371 |

*Primary Examiner*—Ramon O. Ramirez
*Assistant Examiner*—Stephen S. Wentsler
*Attorney, Agent, or Firm*—Bell, Boyd & Lloyd

[57] ABSTRACT

An angle controller for an image display is disclosed including a rotating hole formed in a hemispherical support portion; a control hole formed on a rotating piece to be rotatably inserted into the rotating hole and for controlling a rotating protrusion of the detaching/attaching device to rotate above a predetermined angle; rotating device for making the rotating piece rotate; an angle controlling surface for controlling the rotation angle of a rotating piece; a control piece for controlling the angle controlling surface to rotate at a predetermined angle; and fixing device for fixing the control piece.

5 Claims, 5 Drawing Sheets

ANGLE CONTROLLER FOR IMAGE DISPLAY

FIELD OF THE INVENTION

The present invention relates to an angle controller for an image display, and more particularly, to an angle controller for an image display, which is mounted on a large product so that a user is able to freely control the angle of the display.

BACKGROUND OF THE INVENTION

As shown in FIG. 1, a conventional angle controller for an image display comprises a support plate 1, a upper plate 4, a hemispherical support portion 2 for allowing upper plate 4 to rotate left and right on support plate 1 that is rotated clockwise and counter-clockwise about a vertical axis, a spherical upper portion 5 formed in such a manner that the contact portion of hemispherical support portion 2 and upper plate 4 is round, a boss 3 formed on support plate 1 and inserted into a slot 6 formed on spherical upper portion 5, and a detaching/attaching device 8 in which an insertion hole 7 is formed so that boss 3 is inserted into the hole in a state in which boss 3 is inserted into slot 6 and therefore spherical upper portion 5 is in contact with hemispherical support portion 2. Boss 3 inserted into insertion hole 7 is fastened by a fixing nut 9 and a fixing screw 10 at its top end. Pressing protrusions 11 and a rotating protrusion 12 are formed on detaching/attaching device 8. A rotating hole 13 into which rotating protrusions 12 are inserted via slot 6 is formed in support plate 1.

In this angle controller for an image display, when the image display is rotated, rotating protrusions 12 formed on detaching/attaching device 8 rotate according to the shape of rotating hole 13.

However, with the conventional controller, the rotation of an image display is limited to one or two ways, for instance, 90° or 45° horizontally that is rotating the image display 90° or 45° about a vertical axis. This does not allow the user to freely adjust the angle of the image display.

For another conventional techniques related to the present invention, there are disclosed U.S. Pat. Nos. 4,554,590 and 4,533,105.

SUMMARY OF THE INVENTION

It is an object of the present invention to provide an angle controller for an image display in which the user is able to freely adjust the angle of the image display.

To accomplish the object of the present invention, there is provided an angle controller for an image display which is controlled to rotate by a predetermined angle as a detaching/attaching device rotates, the controller comprising: first angle controlling means for controlling the angle of the rotating detaching/attaching device left and right by a rotating piece; and second angle controlling means for controlling the angle of the first angle controlling means left and right.

BRIEF DESCRIPTION OF THE ATTACHED DRAWINGS

DETAILED DESCRIPTION OF THE INVENTION

Figure 1:
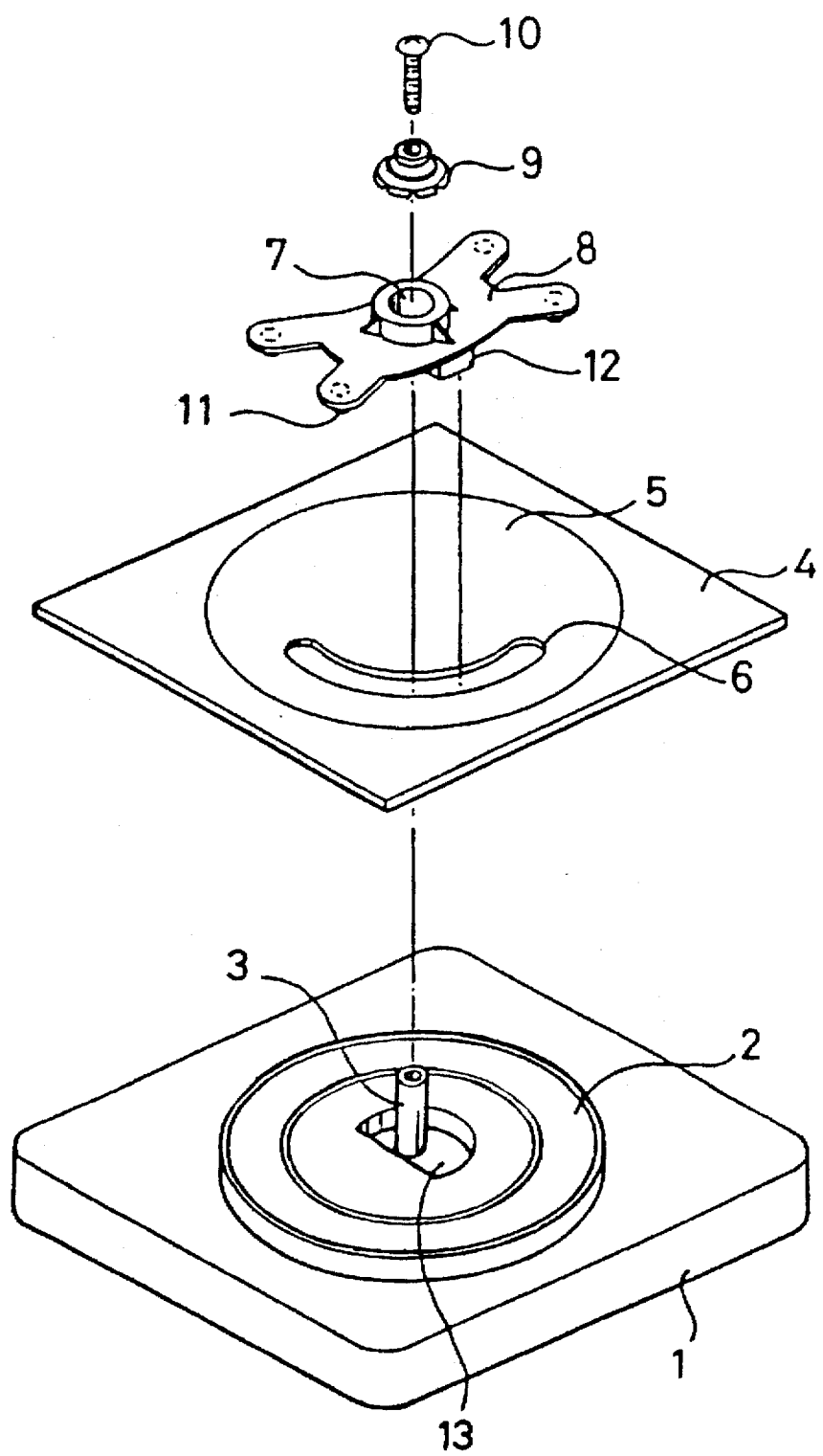
FIG. 1 is an exploded perspective view of an angle controller for a conventional image display.
Figure 2:
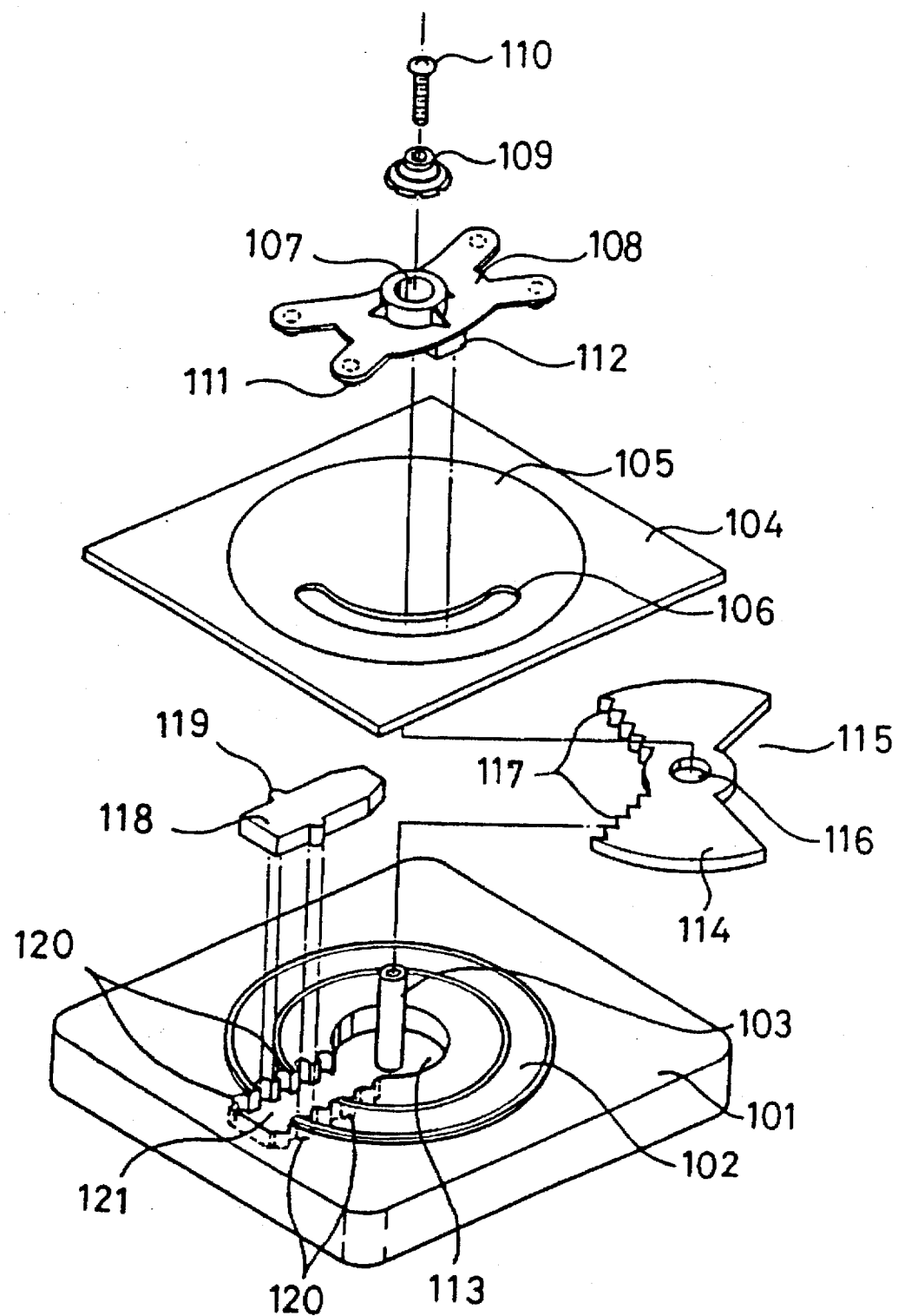
FIG. 2 is an exploded perspective view of an angle controller for an image display of the present invention.

Referring to FIG. 2, the angle controller for an image display of the present invention comprises a support plate 101, a upper plate 104, a hemispherical support portion 102 for allowing upper plate 104 to rotate left and right on support plate 101, a spherical upper portion 105 formed in such a manner that the contact portion of hemispherical support portion 102 and upper plate 104 is round, a boss 103 formed on support plate 101 and inserted into a slot 106 formed on spherical upper portion 105, and a detaching/attaching device 108 in which an insertion hole 107 is formed so that boss 103 is inserted into the hole in a state in which boss 103 is inserted into slot 106 and therefore spherical upper portion 105 is in contact with hemispherical support portion 102. Boss 103 inserted into insertion hole 107 is fastened by a fixing nut 109 and a fixing screw 110 at its top end. Pressing protrusions 111 and a rotating protrusion 112 are formed on detaching/attaching device 108. The angle controller further comprises first angle controlling means for controlling the angle of rotating detaching/attaching device 108 left and right by a rotating piece 114, and second angle controlling means for controlling the angle of the first angle controlling means left and right.

The first angle controlling means comprises a rotating hole 113 formed in hemispherical support portion 102, rotating piece 114 to be rotatably inserted into rotating hole 113, a control hole 115 for controlling rotating protrusion 112 of detaching/attaching device 108 from rotating above a predetermined angle, and rotating means for making rotating piece 114 rotate.

The rotating means has a hole 116 in rotating piece 114 so that rotating piece 114 is rotatably inserted into boss 103 formed in support plate 101 whereby the boss is insertable into the rotating piece so that the rotating piece can rotate.

The second angle controlling means comprises an angle controlling surface 117 for controlling the rotation angle of rotating piece 114, a control piece 118 for controlling angle controlling surface 117 to rotate at a predetermined angle, and fixing means for fixing control piece 118. The angle controlling surface 117 has stairs.

The fixing means comprises a fixing protrusion 119 formed on both sides of control piece 118, and a fixing hole 121 having a plurality of insertion recesses 120 on its sidewall into which fixing protrusion 119 is inserted as the position of control piece 118 is varied.

In this configuration of the invention, when the user rotates the image display, rotating protrusion 112 formed on detaching/attaching plate 108 rotates.

When the image display rotates above a predetermined angle, rotating protrusion 112 is blocked by one side of control hole 115 formed on rotating piece 114 so that the display is not rotated further.

Figure 3:
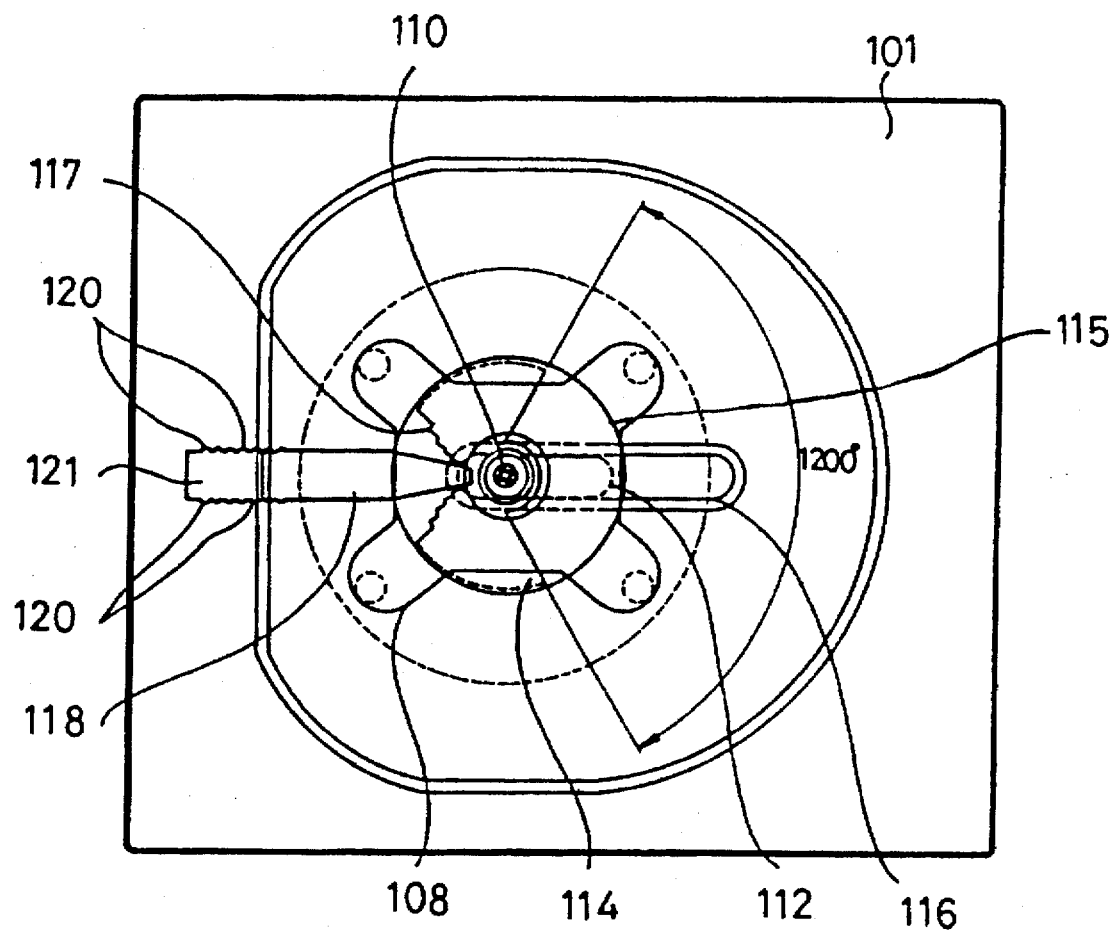
FIG. 3 is a plan view of the angle controller for the image display of the present invention.
Figure 4:
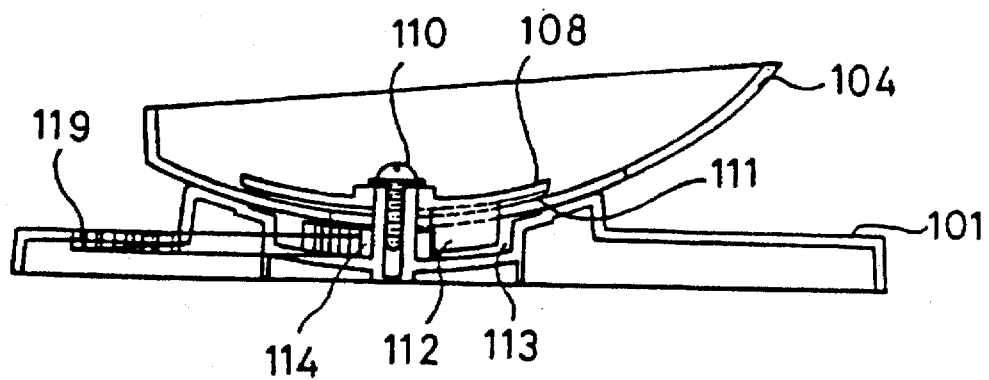
FIG. 4 is a cross-sectional view of the angle controller for the image display of the present invention.

In case that the angle of control hole 115 formed on rotating piece 114 is 120° as shown in FIG. 3, the rotation angle of the image display becomes 120°. This is because the front end of control piece 118 is located at the center of angle controlling surface 117 so as to prevent the movement of rotating piece 114 and thus preventing the change of the angle.

Figure 5:
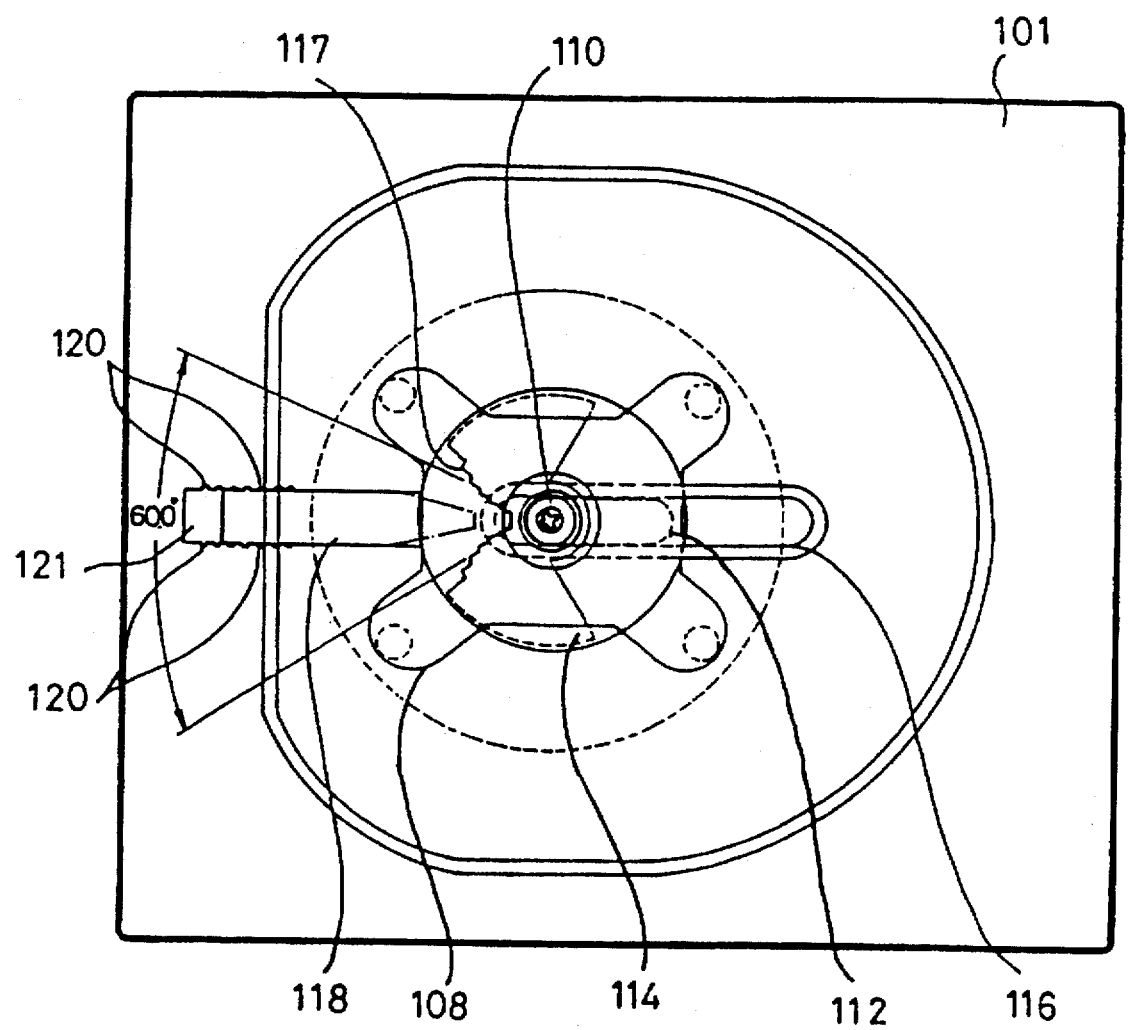
FIG. 5A is a plan view of the angle controller for an image display of the present invention, in which the rotating piece rotates more by 60°.
FIG. 5B is a plan view of the angle controller for an image display of the present invention, in which the rotating piece rotates more by 84°.
Figure 5:
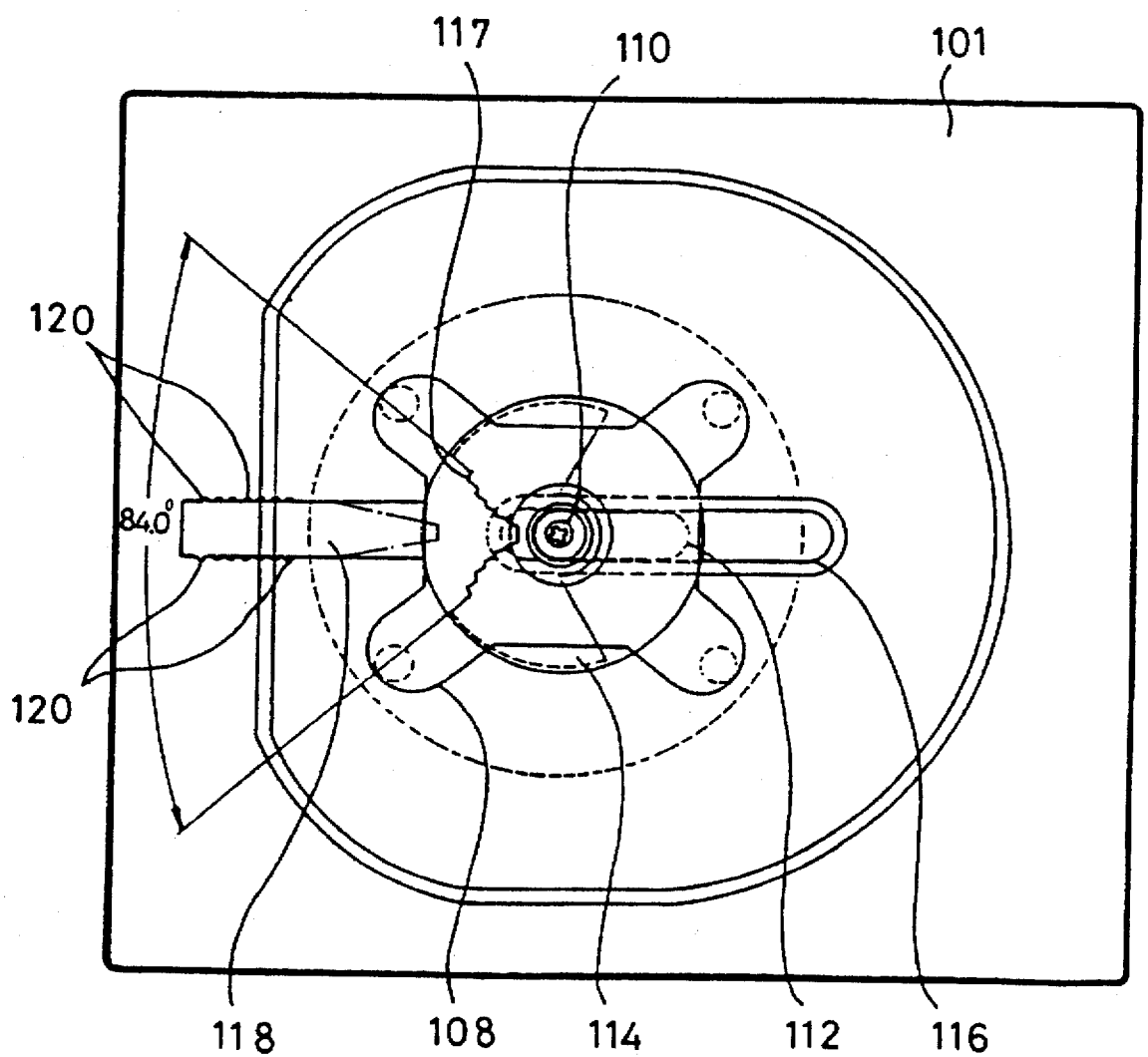

In order to rotate the image display more, control piece 118 secured to fixing hole 121 is moved so that fixing protrusion 119 formed on control piece 118 is fixedly inserted into insertion hole 120 formed on the sidewall of fixing hole 121, as shown in FIGS. 5A and 5B.

In FIG. 5A, rotating piece 114 is rotated more by 60°. In FIG. 5B, the rotating piece rotates more by 84°. This allows the rotation angle of detaching/attaching device 108 to be varied freely.

As described above, the rotation angle of detaching/attaching device 108 is controlled according to the angle of control hole 115 formed on rotating piece 114. The rotation angle of detaching/attaching device 108 is further controlled because rotating piece 114 rotates further when the position of control piece is shifted. In short, the present invention controls the angle of the image display at various stages on the user's demand, yielding a convenience in use.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. An angle controller for an image display which is controlled to rotate by a predetermined angle as a detaching/attaching device rotates, said controller comprising:

first angle controlling means for controlling the angle of said rotating detaching/attaching device clockwise and counter-clockwise about a vertical axis by a rotating piece; and second angle controlling means for controlling the angle of said first angle controlling means, said first angle controlling means comprising:

a rotating hole formed in a hemispherical support portion;

a control hole formed on said rotating piece to be rotatably inserted into said rotating hole and for controlling a rotating protrusion of said detaching/attaching device from rotating above a predetermined angle; and a rotating means for making said rotating piece rotate wherein rotating the image display is limited when rotating protrusion contacts one side of the control hole formed on the rotating piece.

2. An angle controller for an image display as claimed in claim 1, wherein said second angle controlling means comprises:

an angle controlling surface for controlling the rotation angle of the rotating piece;

a control piece interacting with the angle controlling surface for controlling said angle controlling surface to rotate at a predetermined angle; and fixing means for fixing said control piece as its position is varied relative to the angle controlling surface.

3. An angle controller for an image display as claimed in claim 2, wherein said angle controlling surface has stairs.

4. An angle controller for an image display as claimed in claim 2, wherein said fixing means comprises:

a fixing protrusion formed on both sides of said control piece; and a fixing hole having a plurality of insertion recesses on its sidewall into which each of the fixing protrusions are inserted as the position of said control piece is varied.

5. An angle controller for an image display as claimed in claim 1, wherein said rotating means has a hole in said rotating piece so that said rotating piece is rotatably inserted into a boss formed in a support plate whereby the boss is insertable into the rotating piece so that the rotating piece can rotate.

* * * * *